United States Patent [19]

Zabrocki et al.

[11] Patent Number: 4,520,165

[45] Date of Patent: May 28, 1985

[54] ABS-MOULDING COMPOSITIONS

[75] Inventors: Karl Zabrocki, Buettgen; Karl-Heinz Ott, Leverkusen; Adolf Schmidt, Cologne; Alfred Pischtschan, Kuerten, all of Fed. Rep. of Germany

[73] Assignee: Bayer Aktiengesellschaft, Leverkusen, Fed. Rep. of Germany

[21] Appl. No.: 574,870

[22] Filed: Jan. 30, 1984

[30] Foreign Application Priority Data

Feb. 10, 1983 [DE] Fed. Rep. of Germany ....... 3304544

[51] Int. Cl.$^3$ ............................................... C08L 55/02
[52] U.S. Cl. ...................................... 525/84; 525/83; 525/86; 525/87
[58] Field of Search ........................ 525/86, 87, 83, 84

[56] References Cited

U.S. PATENT DOCUMENTS

| 3,509,238 | 4/1970 | Aubrey et al. | |
| 3,576,910 | 4/1971 | Jastrzebski . | |
| 3,928,494 | 12/1975 | Aliberti . | |
| 3,931,356 | 1/1976 | Dalton | 525/86 |
| 4,186,155 | 1/1980 | Delsarte | 525/86 |
| 4,243,765 | 1/1981 | Kekkula et al. | 525/86 |
| 4,277,574 | 7/1981 | Jastrzebski et al. | 525/87 |
| 4,404,323 | 9/1983 | van der Loos et al. | 525/86 |

FOREIGN PATENT DOCUMENTS

| 1804763 | 5/1969 | Fed. Rep. of Germany . | |
| 1813719 | 7/1969 | Fed. Rep. of Germany . | |
| 1089356 | 11/1967 | United Kingdom | 525/86 |
| 1235346 | 6/1971 | United Kingdom . | |

*Primary Examiner*—Allan M. Lieberman
*Attorney, Agent, or Firm*—Connolly and Hutz

[57] ABSTRACT

This invention relates to thermoplastic moulding compositions of the ABS-type produced in emulsion and having improved properties in relation to known ABS-moulding compositions, particularly extreme toughness coupled with ready processibility and high surface gloss.

1 Claim, No Drawings

ABS-MOULDING COMPOSITIONS

This invention relates to thermoplastic moulding compositions of the ABS-type produced in emulsion and having improved properties in relation to known ABS-moulding compositions, particularly extreme toughness coupled with ready processibility and high surface gloss.

ABS-moulding compositions are two-phase plastics of:

I. a thermoplastic copolymer of styrene and acrylonitrile in which all or part of the styrene may be replaced by α-methyl styrene or by methyl methacrylate; this copolymer, which is also known by the name of SAN-resin or matrix resin, forms the outer phase;

II. at least one graft polymer which has been produced by grafting one or more of the monomers mentioned in I. onto butadiene homopolymer or copolymer ("graft base"). This graft polymer ("elastomer phase" or "graft rubber") forms the disperse phase in the matrix resin.

For the same matrix, the toughness of an ABS-moulding composition is essentially determined by the graft rubber. At the present time, the toughness obtainable with conventional ABS-moulding compositions is not always entirely adequate for moulding subjected to severe stressing, for example in the interior of motor vehicles. Accordingly, there is a need for graft rubbers on the basis of which it is possible to produce ABS-moulding compositions which increased toughness without any deterioration in their other properties, such as processibility and surface gloss.

DE-AS No. 18 13 719 describes tough, readily processible ABS-moulding compositions which are obtained by the single-stage, emulsion graft polymerization under pressure of from 75 to 90 parts by weight of a monomer mixture onto from 10 to 25 parts by weight of a mixture of two rubber latices, of which one is a pure polybutadiene and the other an SBR-latex having a styrene content of less than 50% and a specific particle size.

DE-OS No. 18 04 763 describes an ABS-material which is produced by separately synthesizing and then mixing a crosslinked graft copolymer having a swelling index of >20 and the matrix resin. Although, as can be seen from the Examples, it is possible by this method to obtain extreme toughness, gloss is adversely affected.

U.S. Pat. No. 3,509,238 describes ABS-products which are produced using two graft polymers of which one is weakly grafted and the other strongly grafted. However, these products exhibit inadequate properties at low temperatures.

U.S. Pat. No. 3,928,494 describes ABS-products with one weakly grafted and one strongly grafted graft polymer, the weakly grafted, finely divided material agglomerating on spray drying or coagulation to form particle aggregates. Aggregates such as these are loosely bound structures which are torn apart again at high temperatures and under severe shear forces, of the type which can be encountered for example in injection moulding, and as a result lead to inadequate product toughness values.

It has now been found that ABS-moulding compositions having improved toughness can be produced from 10 to 65% by weight of at least one graft polymer obtainable by the emulsion polymerization of styrene and acrylonitrile in a weight ratio of from 90:10 to 50:50:

the styrene being completely or partly replaceable by α-methyl styrene or by methyl methacrylate, in the presence of at least two butadiene polymer latices of type A and B, each of which contains from 0 to 30% of another vinyl monomer in copolymerized form, the weight ratio between the monomers used and the butadiene polymer used amounting to between 35:65 and 70:30;

90 to 35% by weight of a copolymer of styrene and acrylonitrile in a weight ratio of from 90:10 to 50:50, the styrene being completely or partly replaceable by α-methyl styrene or methyl methacrylate, characterized in that the butadiene polymer latex (A) has a particle diameter $d_{50}$ of $\geq 0.35$ μm and a gel content of $<85\%$ and the butadiene polymer latex (B) has a particle diameter $d_{50}$ of $\leq 0.30$ μm, and the grafting site interval of the graft polymer produced therefrom amounts to between 4000 and 10,000 $C_4$-units.

The Graft Base

The graft base used is a mixture of at least two butadiene polymer latices, one of type (A) and the other of type (B). The weight ratio of (A) to (B), based on the respective solids contents of the latices, amounts to between 90:10 and 5:95 and preferably to between 60:40 and 15:85. If the proportion of latex (A) is increased, there is an increased risk of undesirable coagulation during the grafting reaction; smaller proportions of latex (A) ultimately reduce the toughness of the ABS-products.

The butadiene polymer latex (A) is a homopolymer of butadiene or a copolymer of butadiene with up to 30% by weight of another vinyl monomer, for example acrylonitrile, methacrylonitrile, styrene, α-methyl styrene, halogen styrene, $C_1$-$C_4$-alkyl styrenes, $C_1$-$C_6$-alkyl acrylates and methacrylates, alkylene glycol diacrylates, divinyl benzene, chloroprene or isoprene. Polybutadiene and copolymers with styrene or acrylonitrile are preferred.

According to the present invention, the latex (A) has an average particle diameter $d_{50}$ of $\leq 0.35$ μm and a gel content of $<85\%$. In the following, the term particle size is frequently used instead of particle diameter, but the meaning is the same.

The average particle diameters are determined by ultracentrifuge measurements (cf. W. Scholtan, H. Lange: Kolloid Z. und Z. fur Polymere 250, 1972, pages 782–796). The particle size distribution (PSD) determined at the same time may show the latex to be monodisperse or polydisperse. Polydisperse latices, i.e. latices of which the particle diameters are distributed over a certain range, have proved to be more favourable for tough ABS-moulding compositions. Latices having a particle size distribution range (measured as $d_{90}$-$d_{10}$ from the integral particle size distribution) of from 0.8 to 6.0 μm are preferred, those having a particle size range of from 1.5 to 3.5 μm being particularly preferred. The maximum particle size of latex (A) ($d_{100}$-value of the integral PSD-curve) should amount to $\leq 8.0$ μm and preferably to $\leq 5.0$ μm. Latices (A) of which the swelling index in toluene amounts to $\geq 25$ are preferably used.

The gel contents and swelling indices are measured as follows:

1 g of the dry, stabilized size-reduced rubber [weigh out=a (g)]are rolled around for 24 hours in a brown glass-stoppered bottle with exactly 100 cc (pipette) of toluene. A moderate vacuum is then applied through a double cloth filter until the filtrate no longer shows a deposit. The bottle is rinsed out with a few val. of the solvent and the deposit washed out with a few val. The washing and rinsing solutions are combined with the main filtrate. Air is then drawn through the deposit until the filter appears dry.

The filter with the deposit is carefully lifted and transferred to a Petri dish which is then weighed with a closed cover=b (g). The dish which is opened against after weighing is best dried overnight at 70° C. in a drying cabinet. After removal from the drying cabinet, the dish is left standing exposed to air for 1 hour and is then reweighed=c (g).

The filtrate is quantitatively transferred to a previously weighed out glass beaker (=d (g)), concentrated by evaporation on a water bath, dried in a drying cabinet at 70° C. until constant weight (changes in weight in the third place after the decimal point may be ignored) and weighed=e (g).

$$\frac{a - (e - d) \cdot 100}{a} = \% \text{ gel} \quad (1)$$

$$\frac{(b - c) + a - (e - d)}{a - (e - d)} = \text{swelling index} \quad (2)$$

The limits indicated (gel content $\leq 85\%$, swelling index $\geq 25$) show the latices to be relatively widemesh networks with uncrosslinked fractions.

Higher gel contents and lower swelling indices give low toughness values in ABS-moulding compositions. Particularly preferred ranges are from 30 to 80% for the gel content and from 35 to 50 for the swelling index.

The latices (A) are generally produced by emulsion polymerization. The necessary reaction conditions, auxiliary materials and procedures are known in principle.

In order to obtain the required particle sizes and degrees of crosslinking, defined polymerization conditions have to be maintained and certain procedures adopted in the preparation of the latices (A). For example, emulsion polymerization may be used where the water/monomer ratio is low and the emulsifier is added at intervals. To adjust the high swelling index, it is preferred to work at temperatures of <50° C. and, more particularly, at temperatures of <30° C., polymerization preferably being initiated with organic activator systems.

It is also possible using known methods initially to prepare a finely divided butadiene polymer and then to agglomerate it in known manner for the purpose of adjusting the necessary particle size. Relevant methods are described, for example, in EP-PS No. 0 029 613; EP-PS No. 0 007 810; DD-PS No. 144,415: DE-AS No. 12 33 131; DE-AS No. 12 58 076; DE-OS No. 21 01 650; U.S. Pat. No. 1,379,391.

It is also possible to use the so-called seed polymerization process, in which a finely divided butadiene polymer is initially produced and then further polymerized to form relatively large particles by further reaction with butadiene-containing monomers.

In principle, butadiene polymer latices (A) may also be prepared by emulsifying butadiene polymers in aqueous medium (cf. Japanese Patent Application No. 55. 125.102). The butadiene polymer latex (B) is a homopolymer of butadiene or a copolymer of butadiene with $\leq 30\%$ by weight of another vinyl monomer copolymerizable therewith, for example acrylonitrile, methacrylonitrile, styrene, α-methyl styrene, halogen styrene, $C_1$–$C_4$-alkyl styrene, $C_1$–$C_6$-alkyl acrylate and methacrylates, alkylene glycol diacrylates and methacrylates, divinyl benzene, isoprene or chloroprene. Polybutadiene is the preferred copolymer.

The latex (B) has an average particle diameter $d_{50}$ of $\leq 0.30$ μm (measured in the same way as for latex (A). A particle diameter $d_{50}$ of from 0.08 to 0.25 μm is preferred. The particle size distribution is variable, although the $d_{100}$ value should not exceed 3.5 μm. The preferred gel content is from 75 to 90%. The swelling index of the butadiene polymer (B) is in the range from 5 to 50 and preferably in the range from 35 to 45.

In principle, latex (B) may be prepared by any of the processes described for latex (A), emulsion polymerization being the most favourable. In general, a high concentration of emulsifier and a high water-to-monomer ratio are used. Hot or cold polymerization is possible and may be followed by agglomeration or by seed polymerization to increase the size of the particles.

Activator systems which are active at temperatures in the range from 30° to 75° C. are preferably used.

The Graft Polymers may be produced by polymerizing the graft monomers in the presence of the particular graft base using the specified ratios of monomer to graft base. Although emulsion polymerization is preferred, transition to suspension polymerization (cf. U.S. Pat. No. 3,436,440) is also possible. Emulsion polymerization may be carried out using standard emulsifiers, such as alkyl sulfates, alkyl sulfonates, aralkyl sulfonates, soaps of saturated or unsaturated fatty acids and of alkaline disproportionated or hydrogenated abietic or tall oil acids. Suitable activators include inorganic and organic peroxides, for example $H_2O_2$, di-tert.-butyl peroxide, cumene hydroperoxide, dicyclohexyl percarbon, p-menthane hydroperoxides, inorganic persalts, such as K-persulfate, K-perphosphate, Na-perborate and also redox systems consisting of a, generally organic, oxidizing agent and a reducing agent, heavy metal ions being additionally present in the reaction medium (cf. H. Logemann in: Houben-Weyl, Methoden der organischen Chemie, Vol. 14/1, pages 263 to 297).

Although graft polymerization reactions are never complete, the extent of grafting, defined in DE-AS No. 24 20 358 and in the following as the degree of grafting D, affects the properties of the end product. The degree of grafting may be varied through the particle size of the base, by additions of, for example, mercaptans and α-olefins, by the type and quantity of emulsifiers used and also by the type and quantity of activator used.

In general, degrees of grafting D from 0.3 to 1.0 and preferably from 0.40 to 0.80 are favourable for ABS-moulding compositions according to the present invention. The ratio of the monomers used to the quantity of butadiene polymer amounts to between about 35:65 and 70:30. Beyond these limits, the toughness of the products decreases (cf. Comparison Examples a to i). According to the present invention, the interval between two grafting sites ("average grafting site interval") in the molecules of the graft base should be between 4000 and 10,000 "$C_4$-units". A "$C_4$-unit" is a chain of 4 carbon atoms which is contained in the structural element derived from butadiene. In the case of butadiene copolymers, the number of C-atoms supplied by the comonomers has to be divided by 4, in which case the result is expressed as "C4-units" of the comonomer. The average grafting site interval (GSI) is calculated in accordance with the following equation:

$$GSI = \frac{M_w}{54 \cdot D},$$

where $M_w$ is the average molecular weight of the grafting brance chains, 54 is the molecular weight of a C4(butadiene)-unit, D is the degree of grafting, $$D = \frac{\text{quantity of the chemically bound resin}}{\text{quantity of the rubber base}}.$$

The degree of grafting D is determined from the quantity of graft base used or analyzed and from the acetone-insoluble fraction of the graft polymer.

According to the studies of DINGES et al. (Die Makromol. Chemie 101, 1967, pages 200–213), the molecular weight $M_w$ of the grafting branch chains is identical with the molecular weight of the non-chemically bound resin material formed "besides" during the grafting reaction, so that molecular weight determination may be carried out more easily with this soluble material. The determination itself is best carried out by viscosimetry of a solution of the soluble resin separated off in dimethyl formamide in accordance with the works of H. Baumann and H. Lange (Angew. Makromol. Chemie 9, 1969, pages 16 et seq. and 14, 1970, pages 25 et seq.).

Apart from the measures mentioned above, D, $M_w$ and GSI may be varied in known manner (cf. B. Chauvel: Copolymers, Polyblends and Compositions, Ed. N. Platzer, Adv. in Chem. Series 142, ACS Washington, 1975). Known measures include, in particular, the choice of the monomer mixture to graft base ratio, the type and quantity of initiator used, the reaction temperature, the quantity of emulsifier and the addition of regulators.

GSI-values outside the range according to the invention do not provide for good product qualities. At GSI-values of <4000, the toughness of the products is not high enough, whereas excessive grafting site intervals (GSI-value >10,000) give rise to the post-agglomeration of rubber particles during processing and to reductions in gloss.

The grafting reaction may be carried out by any of the known, relevant methods. For example, it is possible to polymerize a mixture of the monomers. However, it is also possible to add the monomers and, optionally, auxiliaries such as activators, emulsifiers, to the reaction mixture as a function of time. The temperatures are generally in the range from 25° C. to 160° C. and preferably in the range from 40° to 90° C.

According to the invention, styrene and acrylonitrile in a weight ratio of from 90:10 to 50:50 and preferably from 65:35 to 75:25 are used for the grafting reaction, the styrene being completely or partly replaceable by α-methyl styrene or by methyl methacrylate. Mixtures of styrene and acrylonitrile are preferably used.

Graft polymers according to the invention have swelling indices (as measured in accordance with DE-OS No. 18 04 763) of from 5 to 19 and preferably from 7 to 15.

The matrix Resins ("SAN-resin")

The matrix resins consist of copolymers of styrene and acrylonitrile in a weight ratio of from 90:10 to 50:50, the styrene being completely or partly replaceable by α-methyl styrene or by methyl methacrylate and another monomer from the series comprising maleic acid anhydride, maleic (fumaric) acid bis-alkyl ester, maleic acid imide, N-(cyclo)-alkyl maleic imide, N-(alkyl) phenyl maleic imide, indene, optionally being used in a proportion of up to 25% by weight, based on the matrix resin.

Particulars of the production of these resins may be found, for example, in DE-AS No. 24 20 358 and DE-AS No. 27 24 360. Matrix resins produced by mass polymerization have proved to be particularly suitable.

The Moulding Composition

The graft polymer may be mixed with the SAN-resin in various ways. In the production of the components by emulsion polymerization, the latices may be mixed and precipitated together or even separately and the resulting solid mixed. If, for example, the matrix resin is produced by solution or mass polymerization, the graft polymer has to be separately precipitated. This is done by known methods, for example by adding salts and/or acids, after which the precipitated products are washed, dried and optionally converted from the powder form into a granulate form. Multiple-roll stands, mixing extruders or internal kneaders may be used for mixing the precipitated products or granulates.

According to the invention, the graft product makes up from 10 to 65% by weight of the total composition the proportion of the graft polymers being lower because not all monomers form grafting branches. Preferred moulding compositions are made up of 30 to 60 parts of graft products and 70 to 40 parts of matrix resin, the highest toughness values being obtained with proportions of from 40 to 60 parts of graft product.

The necessary or appropriate additives, for example oxidation inhibitors, UV-stabilizers, peroxide neutralizers, antistatic agents, lubricants, flameproofing agents, fillers or reinforcing materials (glass fibers and carbon fibers, etc.) and dyes, may be added to the moulding compositions according to the invention during production, working up, further processing and mould release.

The final forming operation may be carried out using standard processing machines and includes, for example, injection moulding, sheet extrusion optionally followed by hot forming, cold forming, tube and profile extrusion and calendering, etc.

EXAMPLES AND COMPARISON EXAMPLES

The following Examples illustrate the present invention without limiting it in any way. The parts indicated are parts by weight and always relate to solid constituents and polymerizable constituents.

The Graft Bases

Table 1 summarizes the butadiene polymer latices used and their characteristics.

TABLE 1

| Latex No. | Chemical structure | $d_{50}$ | Gel content % | Swelling index | Latex type |
|---|---|---|---|---|---|
| I | Polybutadiene | 0.106 | 97 | 9 | B |
| II | " | 0.296 | 94 | 11 | B |

TABLE 1-continued

| Latex No. | Chemical structure | $d_{50}$ | Gel content % | Swelling index | Latex type |
|---|---|---|---|---|---|
| III | " | 0.184 | 75 | 42 | B |
| IV | " | 0.296 | 67 | 41 | B |
| V | " | 0.238 | 86 | 15 | B |
| VI | 25% of styrene + 75% of butadiene | 0.431 | 76 | 37 | A |
| VII | polybutadiene | 0.407 | 66 | 40 | A |
| VIII | polybutadiene | 0.603 | 94 | 12 | for comparison |
| IX | polybutadiene | 0.320 | 94 | 10 | for comparison |

Grafting Procedures

Procedure P. Persulfate activation

The quantity x of the latex mixture is adjusted with water while stirring to a solids content of approximately 20% and heated to α° C. β parts of $D_2S_2O_8$ dissolved in water are then added. y parts of a mixture of styrene and acrylonitrile (72:28) and 2 parts of a resinic acid emulsifier dissolved in alkalized water are then introduced over a period of 4 hours. Following an after-reaction at 65° C. and the addition of approximately 1.0 part of oxidation inhibitors, the graft latex is coagulated in an MgSO₄-solution containing acetic acid, the resulting powder is washed and then dried in vacuo at 70° C.

| Procedure P | α | β |
|---|---|---|
| P 1 | 58° C. | 0.2 |
| P 2 | 65° C. | 0.5 |
| P 3 | 65° C. | 0.4 |
| P 4 | 65° C. | 0.2 |

Procedure R : Redox activation

The quantity x of latex mixture is adjusted while stirring with water to a solids content of approximately 20%, 0.75 part of dextrose, α parts of β-nitrostyrene and small quantities of complexed Fe⁺⁺-ions are added, the mixture is heated to β° C. and y parts of a mixture of styrene and acrylonitrile (72:28) and a dilute alkaline aqueous emulsion of 0.2 part of diisopropyl benzene hydroperoxide and 2.0 part of resinic acid emulsifier are simultaneously added over a period of 4 to 5 hours. The reaction product is kept at 65° C. for a while and then precipitated and worked up in the same way as before.

| Procedure R | α | β |
|---|---|---|
| R 1 | — | 50° C. |
| R 2 | 0.2 | 45° C. |
| R 3 | 0.2 | 50° C. |

Production and testing of the moulding compositions 50 parts of the graft polymers are mixed in an internal kneader with 50 parts of a styrene/acrylonitrile (72:28)-copolymer ($M_w$ approximately 115,000, $M_w/M_N$—12.0), 2 parts of ethylene diamine bis-stearoyl and 0.2 part of a silicone oil and the resulting mixture is subsequently injection-moulded to form standard small test bars, a plate (for gloss assessment) and a spiral (for assessing flow length).

Notched impact strength was determined at room temperature ($a_K{}^{RT}$) and at —40° C. ($a_K{}^{-40°}$ C.) in accordance with DIN 53 543 (unit: kJ/m²), ball indentation hardness$^{Hc}$ in accordance with DIN 53 546 (unit: N/mm²), dimensional stability under heat in accordance with Vicat B (unit: °C.), gloss on the A–H scale according to DE-AS No. 24 20 358 and flow length at 220° C. using an approximately 8 mm wide and approximately 2 mm thick spiral (unit: cm).

TABLE 2

Comparison Examples a–i; variation of the ratio x:y = graft base: monomer conversion

| Comparison Example | Grafting x:y | Molding composition quantity of graft polymer | quantity of SAN matrix resin | $a_K{}^{RT}$ | $a_K{}^{-40}$ | $H_c$ | Vicat B | Flow length 220° C. | Gloss level |
|---|---|---|---|---|---|---|---|---|---|
| a | 15:85 | 100 | — | 12 | 4 | 96 | 99 | 37 | C |
| b | 25:75 | 100 | — | 19 | 6 | 65 | 93 | 29 | C |
| c | 30:70 | 83.3 | 16.7 | 30 | 17 | 69 | 94 | 29 | D |
| d | 40:60 | 62.5 | 37.5 | 31 | 17 | 68 | 92 | 32 | D |
| e | 50:50 | 50.0 | 50.0 | 29 | 18 | 71 | 91 | 34 | D |
| f | 60:40 | 41.7 | 58.3 | 28 | 18 | 70 | 91 | 37 | C |
| g | 70:30 | 35.7 | 64.3 | 24 | 14 | 67 | 89 | 40 | D-E |
| h | 80:20 | 31.3 | 68.8 | 17 | 7 | 64 | 89 | 42 | C |
| i | 90:10 | 27.8 | 72.2 | 6 | 3 | 63 | 87 | 44 | D |

COMPARISON EXAMPLES a–i

In Comparison Examples a–i, the ratio of the monomers used to the quantity of latex mixture used in the grafting stage is varied. The moulding composition is adjusted to constant rubber contents by the addition of SAN-matrix resin (exception: test a).

The graft bases used were III and VI in a ratio of 80:20, grafting being carried out by procedure P 1.

The test results (Table 2) show that, with ratios of x, y which lie outside the invention, distinct disadvantages are obtained in the quality of the products:
if x/y=35/65, there is a drastic reduction in toughness;
if x/y=70/30, there is a reduction in toughness both at low temperatures and at room temperature.

COMPARISON EXAMPLES k–s

Comparison Examples k–s show that with latices and latex combinations which do not correspond to those of the invention, it is impossible to obtain high toughness values, despite x : y ratios which do correspond to the invention and despite some GSI-values which also correspond to the invention (Table 3).

COMPARISON EXAMPLES t-y

Comparison Examples t-y show that, using latices according to the invention, it is impossible, even with x : y ratios which correspond to the invention, to obtain high toughness values if the GSI-value does not correspond to the invention (Table 4).

EXAMPLES 1 to 10

Table 5 shows the results obtained with combinations according to the invention.

TABLE 3

Comparison Examples k-s; use of latices which do not correspond to the invention

| Comparison Example | No. | Graft base quantitative ratio | Grafting procedure | x:y | GSI | $a_K{}^{RT}$ | $a_K{}^{-40°}$ | $H_c$ | Vicat B | Flow length | Gloss level |
|---|---|---|---|---|---|---|---|---|---|---|---|
| k | II | 100:0 | P2 | 50:50 | 2119 | 20 | 14 | 76 | 91 | 38 | E |
| l | I | 100:0 | P3 | 50:50 | 1540 | 10 | 6 | 81 | 97 | 38 | F |
| m | V | 100:0 | P3 | 50:50 | 1745 | 19 | 14 | 76 | 94 | 36 | E |
| n | IV | 100:0 | P3 | 50:50 | 2421 | 18 | 14 | 77 | 96 | 36 | E |
| o | VIII | 100:0 | P2 | 50:50 | latices form large quantities of coagulate during grafting | | | | | | |
| p | VIII | 100:0 | R1 | 50:50 | | | | | | | |
| q | VIII:IV | 50:50 | R1 | 50:50 | 9809 | 22 | 9 | 75 | 95 | 34 | B-C |
| r | IV | 100:0 | P2 | 30:70 | 2726 | 19 | 5 | 78 | 94 | 31 | B-A |
| s | IX:VII | 80:20 | R1 | 50:50 | 4231 | 17 | 8 | 74 | 94 | 33 | E |

TABLE 4

Comparison Examples t-y; use of latices according to the invention for GSI-values which do not correspond to the invention

| Comparison Example | Graft bases No. | Quantitative ratio | Graft procedure No. | x:y | GSI | $a_K{}^{RT}$ | $a_K{}^{-40°}$ | $H_c$ | Vicat B | Flow length | Gloss level |
|---|---|---|---|---|---|---|---|---|---|---|---|
| t | II + VI | 50:50 | R1 | 50:50 | 1750 | 14 | 7.5 | 52 | 89 | 29 | D |
| u | II + VI | 50:50 | P2 | 40:60 | 1526 | 20 | 9 | 72 | 90 | 35 | |
| v | V + VI | 80:20 | P3 | 50:50 | 2318 | 19 | 14 | 74 | 91 | 34 | F |
| w | V + VII | 80:20 | P3 | 50:50 | 3317 | 21 | 15 | 76 | 94 | 34 | D-E |
| x | III + VI | 80:20 | P3 | 50:50 | 2421 | 20 | 15 | 76 | 97 | 35 | F |
| y | II + VII | 80:20 | P3 | 50:50 | 2617 | 21 | 15 | 77 | 90 | 35 | E |

TABLE 5

Examples corresponding to the invention

| Example No. | Graft bases No. | quantitative ratio | Grafting procedure No. | x:y | GSI | $a_K{}^{RT}$ | $a_K{}^{-40°}$ | $H_c$ | Vicat B | Flow length | Gloss level |
|---|---|---|---|---|---|---|---|---|---|---|---|
| 1 | II + VI | 50:50 | R2 | 50:50 | 9196 | 28 | 18 | 66 | 86 | 35 | D |
| 2 | III + VI | 80:20 | P1 | 50:50 | 8916 | 33 | 18 | 69 | 94 | 33 | D-E |
| 3 | IV + VII | 80:20 | P1 | 50:50 | 6107 | 32 | 18 | 67 | 92 | 32 | D |
| 4 | IV + VII | 65:35 | P1 | 50:50 | 8891 | 35 | 18 | 66 | 92 | 32 | D |
| 5 | IV + VII | 50:50 | P1 | 50:50 | 8325 | 34 | 14 | 66 | 92 | 32 | D |
| 6 | IV + VII | 80:20 | P3 | 50:50 | 4120 | 32 | 17 | 68 | 93 | 33 | D |
| 7 | II + VI | 50:50 | R3 | 50:50 | 8544 | 27 | 19 | 63 | 89 | 34 | D-E |
| 8 | III + VI | 50:50 | R3 | 50:50 | 7643 | 28 | 20 | 60 | 89 | 34 | D |
| 9 | II + VI | 30:70 | P4 | 50:50 | 4442 | 30 | 18 | 68 | 88 | 33 | C |
| 10 | II + VI | 50:50 | R3 | 50:50 | 8787 | 29 | 19 | 69 | 89 | 33 | D |

We claim:

1. Molding compositions based on ABS-polymers consisting of from 10 to 65% by weight of a graft polymer obtained by the emulsion polymerization of styrene and acrylonitrile in a ratio by weight of from 90:10 to 50:50, the styrene being completely or partly replaceable by α-methyl styrene or methyl methacrylate, in the presence of at least 2 butadiene polymer latices of type (A) and type (B), each of which contains from 0 to 30% of another vinyl monomer in copolymerized form, the ratio by weight of the monomers used to the butadiene polymer used amounting to between 35:65 and 70:30, and from 90 to 35% by weight of at least one copolymer of styrene and acrylonitrile in a ratio by weight of from 90:10 to 50:50, the styrene being completely or partly replaceable by α-methyl styrene or methyl methacrylate, characterized in that the butadiene polymer latex (A) has a particle diameter $d_{50}$ of $\geq 0.35$ μm and a gel content of $<85\%$, and the butadiene polymer latex (B) used has a particle diameter $d_{50}$ of $\leq 0.30$ μm and the average grafting site interval of the graft polymer produced therefrom amounts to between 4000 and 10,000 $C_4$-units.

* * * * *